(12) United States Patent
Raghunathan (10) Patent No.: US 9,726,875 B2
(45) Date of Patent: Aug. 8, 2017

(54) SYNTHESIZING LIGHT FIELDS IN MICROSCOPY

(71) Applicant: Agilent Technologies, Inc., Santa Clara, CA (US)

(72) Inventor: Varun Raghunathan, Santa Clara, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 227 days.

(21) Appl. No.: 14/502,586

(22) Filed: Sep. 30, 2014

(65) Prior Publication Data

US 2016/0091706 A1    Mar. 31, 2016

(51) Int. Cl.
| | |
|---|---|
| *H04N 7/18* | (2006.01) |
| *G02B 21/36* | (2006.01) |
| *G02B 21/06* | (2006.01) |
| *G02B 21/12* | (2006.01) |
| *G02B 21/14* | (2006.01) |

(52) U.S. Cl.
CPC ........... *G02B 21/365* (2013.01); *G02B 21/06* (2013.01); *G02B 21/12* (2013.01); *G02B 21/14* (2013.01)

(58) Field of Classification Search
CPC .. G02B 21/365; G02B 21/367; G02B 21/002; G02B 21/6458
USPC ...................................... 348/79–81
See application file for complete search history.

(56) References Cited

U.S. PATENT DOCUMENTS

2014/0334745 A1* 11/2014 Fleischer .............. G06T 3/4061
                                                                382/284
2016/0003740 A1*  1/2016 Tao ........................ G01N 21/45
                                                                250/459.1

OTHER PUBLICATIONS

Marc Levoy et al.; "Light Field Microscopy"; ACM Transactions on Graphics 25(3), Proc. SIGGRAPH (2006) pp. 1-11.
Mustafa Mir et al.; "Quantitative Phase Imaging"; Progress in Optics, vol. 57 pp. 133-217, (2012) Elsevier B.V. ISSN 0079-6638, http://dx.doi.org/10.1016/B978_0_44_459422_8.00003_5.
Anthony Orth and Kenneth B. Crozier; "Light field moment imaging"; Optics Letters/vol. 38, No. 15/ Aug. 1, 2013 pp. 2666-2668.

* cited by examiner

*Primary Examiner* — Andy Rao (57) ABSTRACT

A light field representation of a sample is synthesized or simulated based on bright field image data and phase image data acquired by a microscope such as a quantitative phase microscope. The light field representation may be utilized to render three-dimensional representations of the sample.

21 Claims, 6 Drawing Sheets

SYNTHESIZING LIGHT FIELDS IN MICROSCOPY

TECHNICAL FIELD

The present invention relates generally to synthesizing light fields from imaging data acquired by a microscope, particularly from bright field image data and phase image data such as may be acquired by a quantitative phase microscope.

BACKGROUND

Microscopes are employed in a wide variety of fields to view various types of biological and non-biological samples. Most microscopes are limited to generating two-dimensional (2D) images of a sample. However, obtaining three-dimensional (3D) views of a sample would be desirable in order to provide better information as to feature shape, topography, and spatial distribution. Currently, 3D images may be acquired by scanning the axial depth of focus through the sample. The focal stack of images acquired in this manner may then be post-processed using 3D deconvolution algorithms and blending techniques to generate 3D views of the sample. However, the computation required makes these techniques slow and non-real time, and discrete axial sampling results in limited 3D information or artifacts in the 3D view.

A light-field camera employs a microlens array in front of its image sensor to capture four-dimensional (4D) light field data from a target object, collecting both the intensity components and directional (or angular) components of light rays emanating from the target object. The light field information may be utilized to generate 3D images of the target object. A common application of light fields in the area of computer graphics deals with rendering objects in three dimensions using intensity and/or direction information. In this case, light fields are often synthesized or simulated under certain realistic assumptions that are intended to place the objects in a three dimensional perspective.

It would be useful to acquire and process light field data in the context of microscopy. The measurement of image intensity and direction information from a biological sample or other sample being studied would enable novel post-processing of the images to look at perspective view, synthetic focusing through the focal stack (without needing to collect additional Z-scan data), and 3D rendering of the sample. For example, presenting the nucleus and features of a biological sample in a 3D perspective would provide additional structural context to the images. The ability to generate perspective views in a regular microscope is especially interesting as it is counterintuitive to the telecentric arrangement of the optical elements in the light path of the microscope, which gives only a 2D projection with negligible depth cues about the sample.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a light field representation of a sample is synthesized or simulated based on bright field image data and phase image data acquired by a microscope such as a quantitative phase microscope.

According to another embodiment, a method for synthesizing a light field representation of a sample includes: acquiring bright field image data for a plurality of pixels of the sample; acquiring phase image data for the plurality of pixels; calculating mean ray pointing direction data for the plurality of pixels based on the acquired phase image data; and calculating a light field based on the calculated mean ray pointing direction data and the acquired bright field image data.

According to another embodiment, a microscope includes: a light source; a sample stage; a light detector; a lens assembly between the sample stage and the light detector, wherein the lens assembly and the light detector are configured for acquiring bright field image data for a plurality of pixels of a sample positioned on the sample stage, and for acquiring phase image data for the plurality of pixels; and a computing device configured for performing any of the methods disclosed herein.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Embodiments disclosed herein are capable of extracting light field parameters from a sample of interest and processing these parameters to synthesizing light fields. The light field parameters include the mean (or average) ray pointing direction, which is measured from phase information, and the measured intensity of the light rays emanating from. A quantitative phase microscope may be utilized to acquire intensity and phase information. However, any other type of microscope now known or later developed that is capable of acquiring intensity and phase information may be utilized in the methods disclosed herein.

Figure 1:
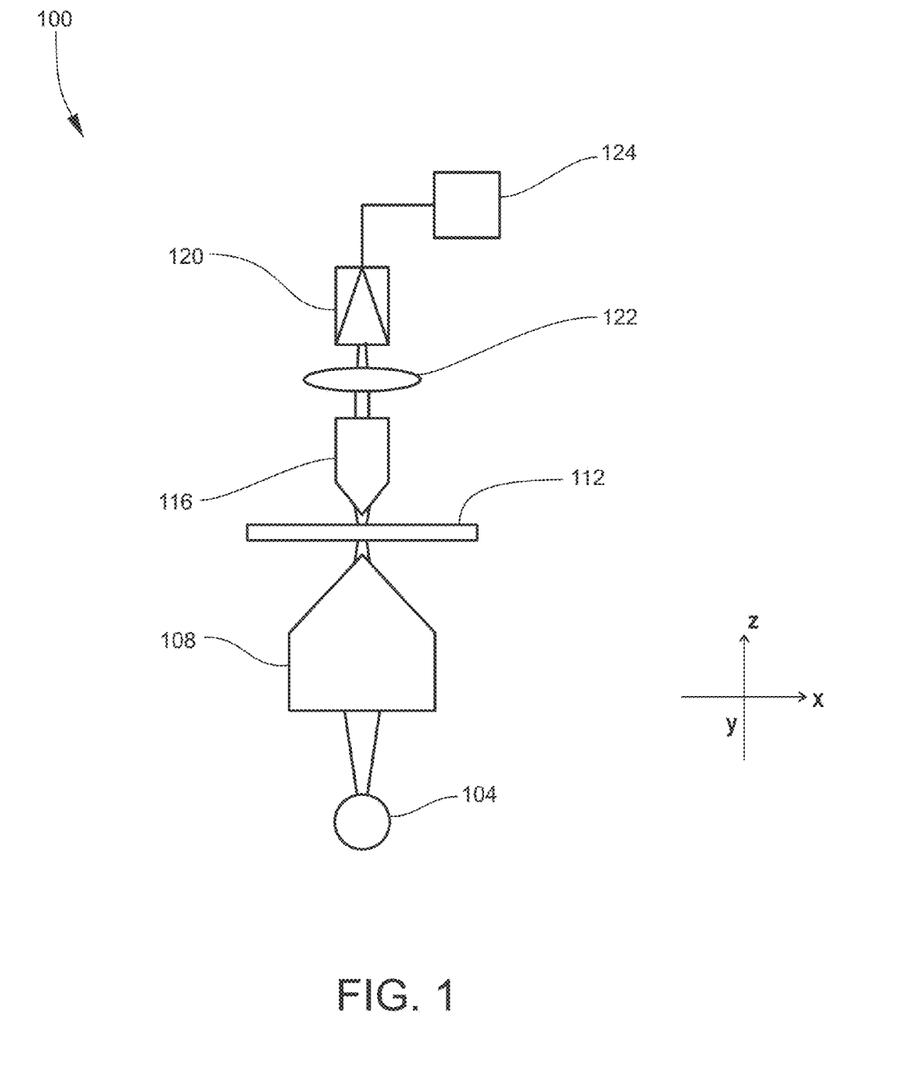
FIG. 1 is a schematic view of an example of a microscope according to some embodiments.

FIG. 1 is a schematic view of an example of a microscope 100 according to some embodiments. Generally, the structure and operation of various types of microscopes are understood by persons skilled in the art, and thus certain components and features of the microscope 100 are described briefly to facilitate an understanding of the subject matter taught herein. The microscope 100 is configured for quantitative phase microscopy, and thus is capable of generating both bright field images (images based on intensity) and phase images (images based on phase shift). It will be noted that quantitative phase microscopy is distinguished from conventional phase contrast microscopy and differential interference contrast microscopy, in that quantitative phase microscopy generates phase images that are independent of intensity based images, i.e., the phase images are based on actual quantitative phase shift values in each pixel. Various techniques to acquire quantitative phase images in a microscope based on holographic techniques, in-line white light interferometry, multiple axial intensity images, etc. have been developed by various research groups.

The microscope 100 may generally include a light source 104, a condenser 108 (condenser lens), a sample stage 112, an objective 116, and a light detector 120. The microscope 100 generally defines an optical axis or path from the light source 104, through the intermediate optics components, and to the light detector 120. The optical path may be considered as including an illumination light path that illuminates a sample under investigation that is supported on the sample stage 112, and a detection light path through which light emitted from the sample is transmitted to the light detector 120 for collection. Thus, the illumination light path runs from the light source 104, through the condenser 108, and to the sample, and the detection light path runs from the sample, through the objective 116, and to the light detector 120. Depending on the embodiment, light "emitted" from the sample may be light transmitted through the sample (as illustrated) or light reflected from the sample. In typical embodiments, the microscope 100 is configured for Köhler illumination.

The sample stage 112 may generally be a platform for securely holding a sample, or a sample and a substrate supporting the sample (e.g., a glass slide), in a fixed position thereon. In embodiments where illumination light is directed from below the sample stage 112 (as illustrated), the sample stage 112 may include a window or aperture to enable passage of the illumination light. In some embodiments, the sample stage 112 may be movable by manual or motorized actuation. That is, the position of the sample stage 112 may be adjustable by the user along the x-axis, y-axis, and/or z-axis. In the present context, the z-axis is taken to be the optical axis or path (vertical from the perspective of FIG. 1), and the x-axis and y-axis are taken to lie in the transverse plane orthogonal to the optical axis or path (i.e., the plane in which the sample stage 112 lies). The sample may generally be any object for which imaging is desired and which is mountable to the sample stage 112. The sample may be biological (e.g., spores, fungi, molds, bacteria, viruses, biological cells or intracellular components, biologically derived particles such as skin cells, detritus, etc.) or non-biological.

The light source 104 may be any light source suitable for optical microscopy, particularly bright field microscopy, and thus may for example be a broadband light source such as a halogen lamp, an incandescent lamp, or other type of lamp. In other embodiments, the light source 104 may be a laser, a laser diode (LD), or a light emitting diode (LED).

The condenser 108 may be any lens or system of lenses configured for concentrating the light from the light source 104 to enhance illumination of the sample. The objective 116 may be any lens or system of lenses configured for collecting the detection light emitted from the sample and focusing the detection light onto the light detector 120.

The light detector 120 may be any imaging device suitable for microscopy such as, for example, the type of imaging device that forms the basis of cameras. In typical embodiments, the light detector 120 is a multi-pixel (or pixelated) imaging device such as, for example, a charge-coupled device (CCD) or an active-pixel sensor (APS) based on complementary metal-oxide-semiconductor (CMOS) technology. In some embodiments, the microscope 100 may include an eyepiece (not separately shown) to enable the user to view the sample, in which case appropriate optical components (e.g., beam splitter) are provided to split the detection light path so that the detection light is directed to both the light detector and the eyepiece. Thus, the light detector 120 in FIG. 1 may be considered as schematically representing an imaging device, or both an imaging device and an eyepiece.

As appreciated by persons skilled in the art, the microscope 100 may further include one or more other types of optical components in the illumination light path and/or the detection light path as desired for a particular application. For example, a relay lens system (i.e., one or more field lenses or relay lenses) may be provided in the illumination light path and/or in the detection light path. In particular, the microscope 100 may include optics 122 specifically configured to function in conjunction with the light detector 120 to generate phase images, such as for example a spatial light modulator as appreciated by persons skilled in the art.

The microscope 100 may also include a computing device 124 communicating with the light detector 120. The computing device 124 may receive images captured by the light detector 120, and digitize and record the images. The computing device 124 may also process captured images as needed for displaying the images (both bright field images and phase images) on a display device such as a computer screen. The computing device 124 may also be configured for generating one or more perspective views, three-dimensional (3D) images, and other types of images of the sample from the illumination and phase data acquired by the light detector 120 as described below. Generally for these purposes, the computing device 124 may include hardware (microprocessor, memory, etc.) and software components as appreciated by persons skilled in the art. In FIG. 1 the computing device 124 may also schematically represent input and output devices that provide a user interface, such as a joystick or mouse controller for user input, a display device for presenting images of the sample, etc.

Figure 2:
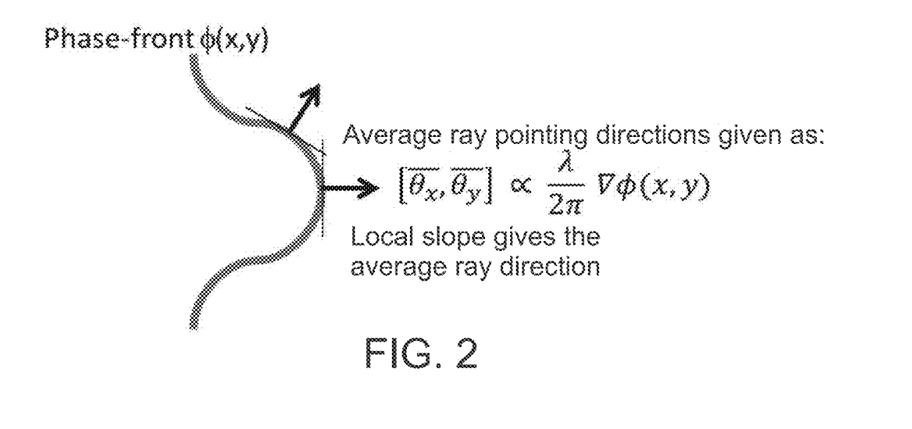
FIG. 2 is a schematic representation of a typical phase front (phase profile) propagated from an illuminated sample at a given location (pixel).

According to embodiments disclosed herein, a light field representation of a sample may be synthesized (or simulated) based on bright field image data and phase image data acquired by the microscope 100, particularly when configured as a quantitative phase microscope. After mounting a sample under investigation on the sample stage 112, the microscope 100 is operated to acquire bright field image data $A(x, y)$ and phase image data $\phi(x, y)$ for a plurality of pixels of the sample, where $(x, y)$ indicates the coordinate location of each pixel interrogated. The computing device 124 records the acquired bright field image data $A(x, y)$ and phase image data $\phi(x, y)$, and processes the data as follows. The phase image data $\phi(x, y)$ are utilized to calculate the mean (or average) ray pointing direction (or energy flow direction) data, $(\overline{\theta x}, \overline{\theta y})$, for the plurality of pixels. This is illustrated in FIG. 2, which is a schematic representation of a typical phase front (phase profile) propagated from an illuminated sample at a given location (pixel). The mean ray pointing direction (arrow in FIG. 2) at a point on the phase profile may be extracted from the local slope (tangent line in FIG. 2) of the phase profile at that point. Thus, the mean ray pointing direction data ($\overline{\theta x}, \overline{\theta y}$) may be found from the following relation:

$$[\overline{\theta x}, \overline{\theta y}] \propto \frac{\lambda}{2\pi} \nabla \varphi(x, y), \quad (1)$$

where $\lambda$ is the wavelength of light utilized to acquire the phase image data $\phi(x, y)$, and $\nabla \phi(x, y)$ is the gradient of the phase image data $\phi(x, y)$.

A light field $L(x, y, \theta x, \theta y)$ may then be calculated based on the measured mean ray pointing direction data ($\overline{\theta x}, \overline{\theta y}$) and the acquired bright field image data $A(x, y)$. In one embodiment, the light field is calculated by applying a Gaussian approximation. As one non-limiting example, the light field may be calculated according to the following relation:

$$L(x, y, \theta x, \theta y) = A(x, y) \times e^{\frac{-(\theta_x - \overline{\theta_x})^2}{\sigma^2}} \times e^{\frac{-(\theta_y - \overline{\theta_y})^2}{\sigma^2}}, \quad (2)$$

where $\theta x$ and $\theta y$ are angular components of a light ray emanating from the sample and are obtained from the phase image data $\phi(x, y)$, and $\sigma^2$ is the variance of the angle of the light ray assumed to spread over a numerical aperture NA of the objective 116 through which the light ray is concentrated. The variance may be calculated as $\sigma^2 = a \sin(NA)^2$. The variance may be computed as the second central moment of the phase profile $\phi(x, y)$.

Figure 3:
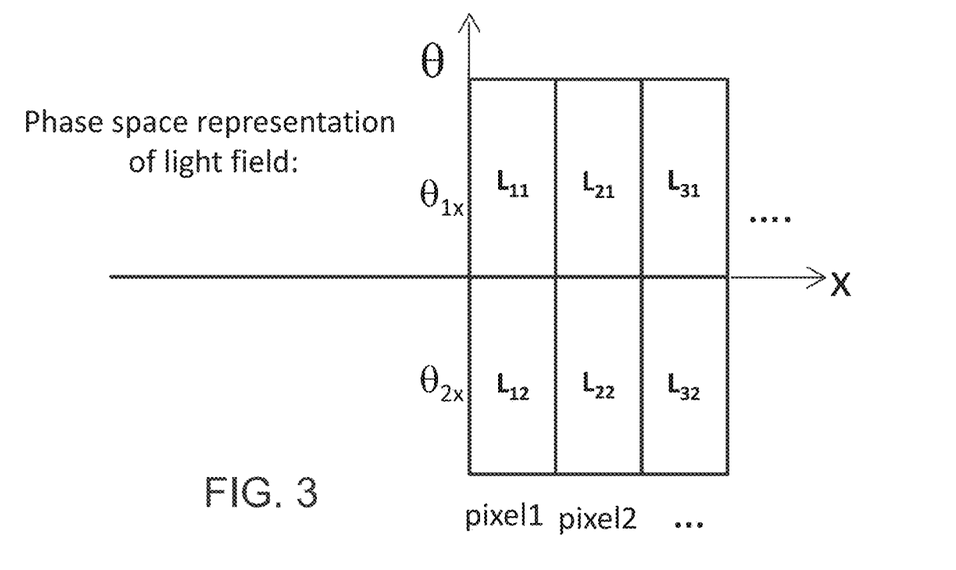
FIG. 3 is a view of a light field represented in phase space, wherein the light field is divided into spatial positions along an x axis and angular components along a y (or θ) axis.

Alternatively, in another embodiment the light field $L(x, y, \theta x, \theta y)$ may be calculated by calculating a plurality of light field components $L_{11}, L_{12}, L_{21}, L_{22}, \ldots$, based on a plurality of intensity values $I_1, I_2, \ldots, I_N$ obtained from the acquired bright field image data $A(x, y)$, and based on a plurality of mean ray pointing direction values $\overline{\theta_1}, \overline{\theta_2}, \ldots, \overline{\theta_N}$ obtained from the acquired phase image data $\phi(x, y)$. In the present context, N is the total number of pixels. A light field component L is calculated in each direction x and y for each pixel. The embodiment of the method assumes that the light field represented in phase space is divided into spatial positions along an x axis and angular components along a y (or $\theta$) axis, as shown in FIG. 3. The light field components $L_{11}, L_{12}, L_{21}, L_{22}, \ldots$, are calculated by solving the following linear set of equations, using bright field and mean phase image data, respectively:

$$L_{11} + L_{12} + L_{13} + \ldots + L_{1N} = I_1 \quad (3)$$
$$L_{21} + L_{22} + L_{23} + \ldots + L_{2N} = I_2$$
$$\vdots$$

$$\frac{\theta_1 L_{11} + \theta_2 L_{12} + \theta_3 L_{13} + \ldots + \theta_N L_{1N}}{L_{11} + L_{12} + L_{13} + \ldots + L_{1N}} = \overline{\theta_1} \quad (4)$$
$$\frac{\theta_1 L_{21} + \theta_2 L_{22} + \theta_3 L_{23} + \ldots + \theta_N L_{2N}}{L_{21} + L_{22} + L_{23} + \ldots + L_{2N}} = \overline{\theta_2}$$
$$\vdots$$

Equation (3) is a representation of the sum of the light fields for one pixel, giving the pixel intensity. Equation (4) provides the mean angular component for each pixel, giving the mean ray pointing direction. Equations (3) and (4) may be rewritten in matrix form and extended to two dimensions (x and y) as follows:

$$\begin{bmatrix} 1 & 1 & 1 & 1 \\ \theta_{1x} & \theta_{1x} & \theta_{2x} & \theta_{2x} \\ \theta_{1y} & \theta_{2y} & \theta_{1y} & \theta_{2y} \end{bmatrix} \begin{bmatrix} L_{111} \\ L_{112} \\ L_{121} \\ L_{122} \end{bmatrix} = I_1 \cdot \begin{bmatrix} 1 \\ \overline{\theta_{1x}} \\ \overline{\theta_{1y}} \end{bmatrix}. \quad (5)$$

Here, the second subscript for the light field has been explicitly expanded to represent x and y directions. This is an under-determined system of equations, which can be solved using least squares routines, as appreciated by persons skilled in the art.

Having solved for the four light field components, any angular component for a given pixel may be rendered by interpolating among the four light field components, as follows:

$$L_1(\theta_x, \theta_y) = \frac{1}{(\theta_{2x} - \theta_{1x})(\theta_{2y} - \theta_{1y})} \cdot \quad (6)$$
$$(L_{111}(\theta_x - \theta_{2x})(\theta_y - \theta_{2y}) + L_{112}(\theta_x - \theta_{2x})(\theta_{1y} - \theta_y) +$$
$$L_{121}(\theta_{1x} - \theta_x)(\theta_y - \theta_{2y}) + L_{122}(\theta_{1x} - \theta_x)(\theta_{1y} - \theta_y)).$$

As described above, the optical system may be positioned in front of the light detector 120 to capture phase images of the sample under investigation. With a plenoptic microscope configuration used in measuring light fields, the light detector 120 with the microlens array is able to capture all of the angular-spatial resolution allowed within the diffraction limit of the instrument. However, there may be a decrease in spatial resolution with every increase in angular resolution captured by the instrument. The techniques described above, however, provide approximate rendering of light fields with good modeling of the ray propagation, the thus may be utilized to obtain a good approximation of the real light fields without much of a trade-off in spatial resolution.

The light fields $L(x, y, \theta x, \theta y)$ synthesized according to methods disclosed herein may be utilized to generate one or more perspective views of the sample under investigation, such as by processing steps performed by the computing device 124. Moreover the light fields $L(x, y, \theta x, \theta y)$, or the perspective views generated from the light fields, may be utilized to generate three-dimensional images, depth maps, and/or refocused or scan-through-focus images of the sample. These images may be viewed using a display device with suitable user-operated input devices such as, for example, a joystick, mouse controller, controls on a control console, etc., to enable the user to select or scan through different images of the sample that are presented on a display device.

Figure 4:
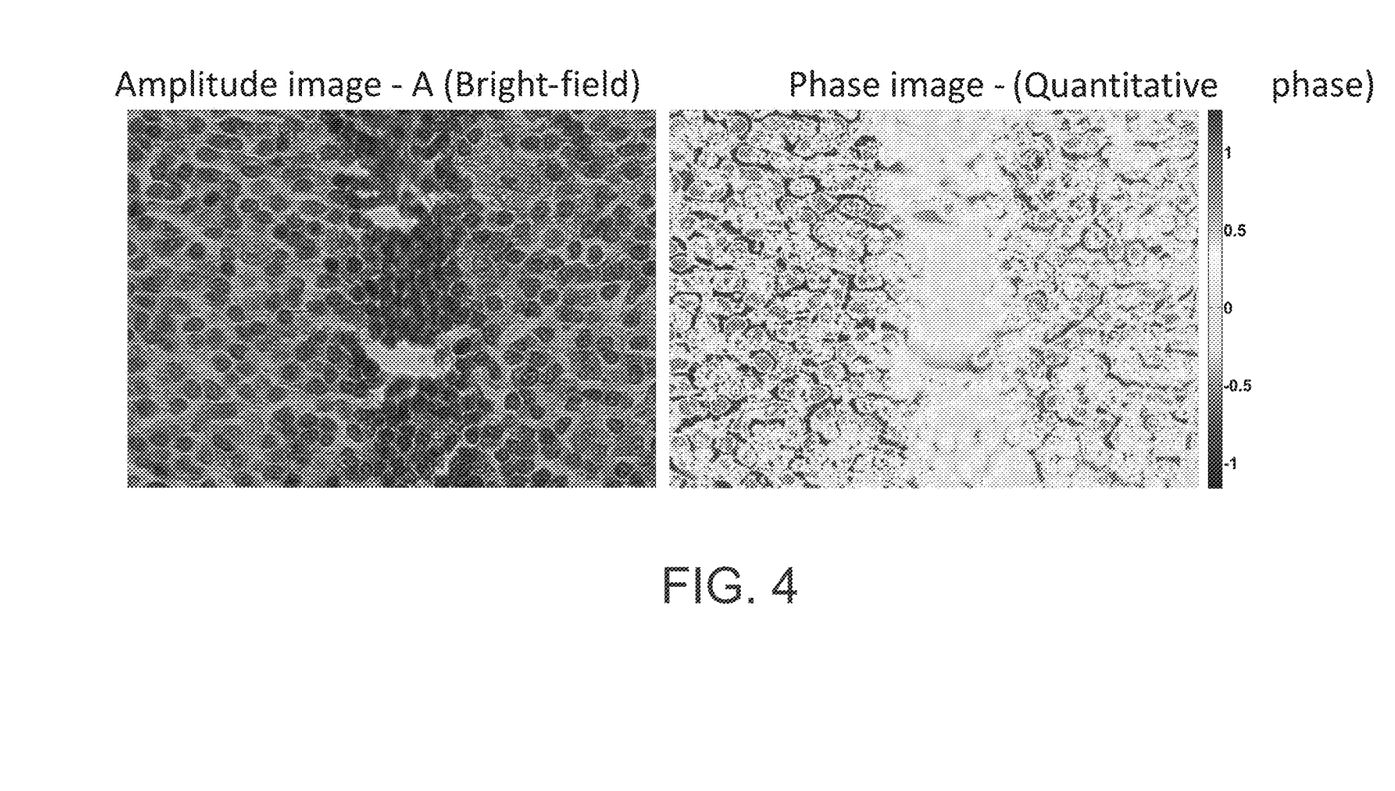
FIG. 4 is an example of a bright-field image and a quantitative phase image acquired from a biological sample by a quantitative phase microscope.
Figure 5:
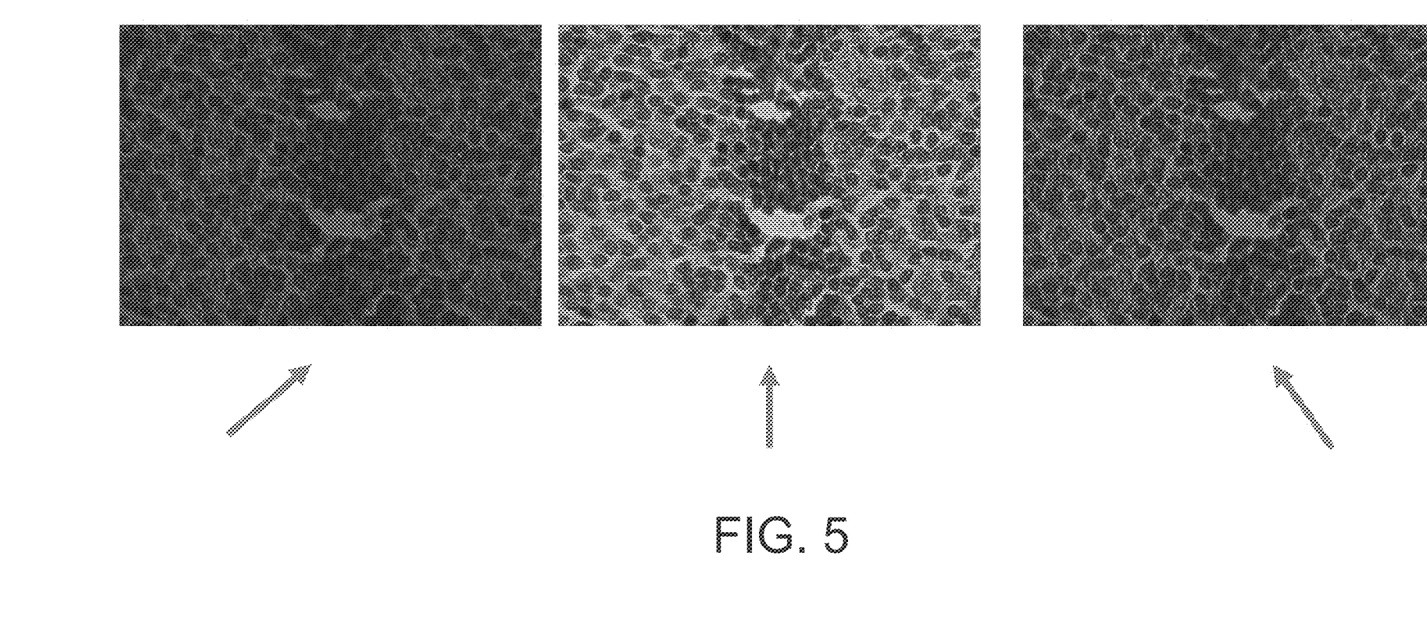
FIG. 5 is a set of perspective views of the same biological sample shown in FIG. 4, which perspective views were rendered from a light-field synthesized from the bright-field image and quantitative phase image data in accordance with the methods disclosed herein.

By way of example, FIG. 4 shows a bright-field image and a quantitative phase image acquired from a biological sample through the use of a quantitative phase microscope as described above. FIG. 5 is a set of perspective views of the same biological sample shown in FIG. 4. The perspective views were rendered from a light-field synthesized from the bright-field image and quantitative phase image data in accordance with the methods disclosed herein. It can be seen that by providing different perspective view, useful and often unique information regarding the sample under study may be obtained, which information may not be obtainable (or at least easily obtainable) from the bright-field and quantitative phase images (e.g., FIG. 4) alone.

Figure 6:
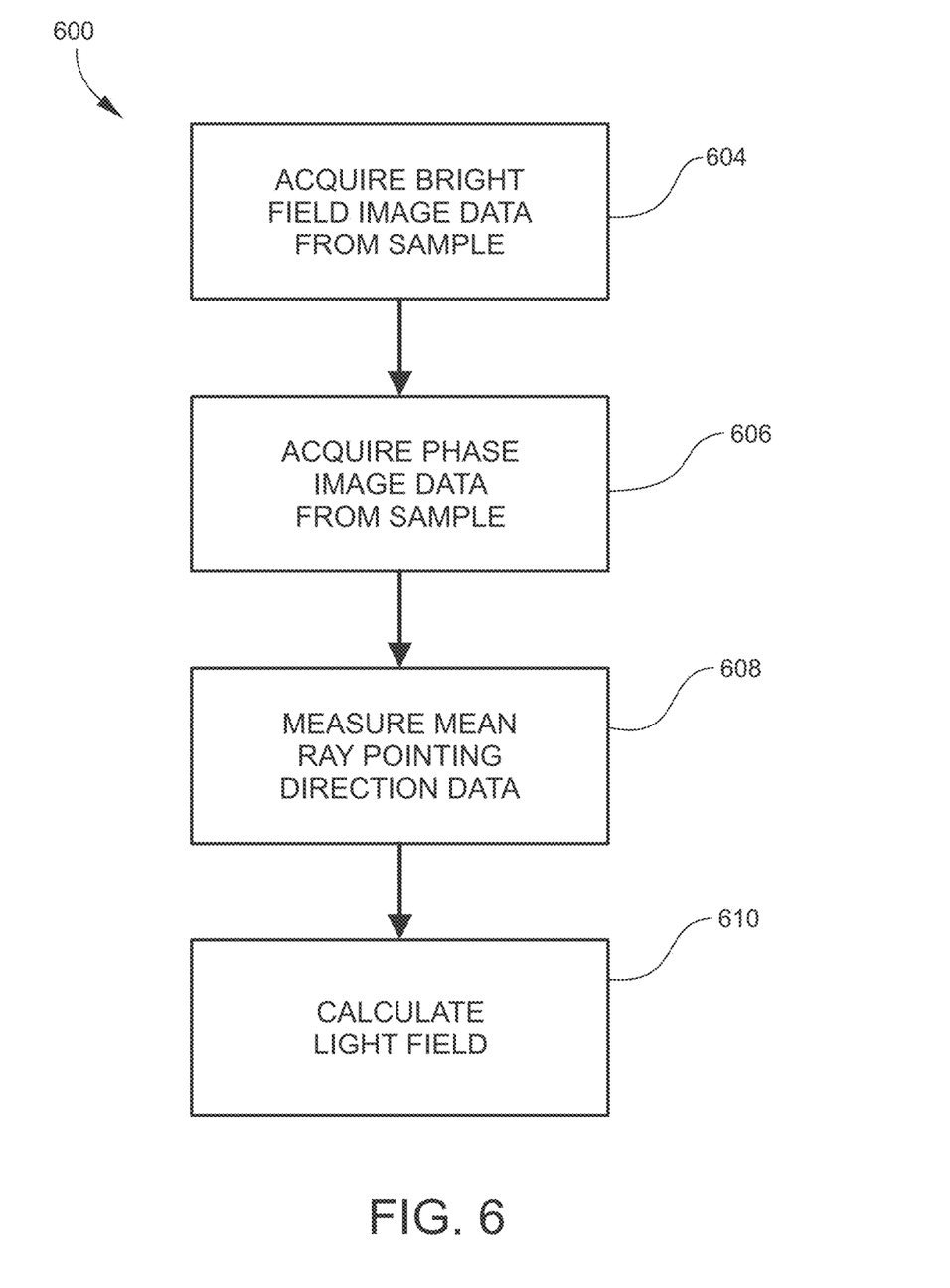
FIG. 6 is a flow diagram of an example of a method for synthesizing a light field representation of a sample according to some embodiments.

FIG. 6 is a flow diagram 600 of an example of a method for synthesizing a light field representation of a sample. In the method, the sample may be mounted on the sample stage, and illuminated by directing illumination light along an illumination light path from a light source, through a condenser, and to the sample, resulting in detection light propagating along a detection light path from the sample, through an objective, and to a light detector. Bright field image data A(x, y) for a plurality of pixels of the sample are acquired (step 604), and may be stored for processing as described above. Phase image data φ(x, y) for the plurality of pixels are also acquired (step 606) and may be stored for processing. Mean ray pointing direction data ($\overline{\theta x}$, $\overline{\theta y}$) for the plurality of pixels are then measured or calculated (step 608) based on the acquired phase image data φ(x, y) as described above. A light field L(x, y, θx, θy) is then calculated (step 610) based on the measured mean ray pointing direction data ($\overline{\theta x}$, $\overline{\theta y}$) and the acquired bright field image data A(x, y).

Figure 7:
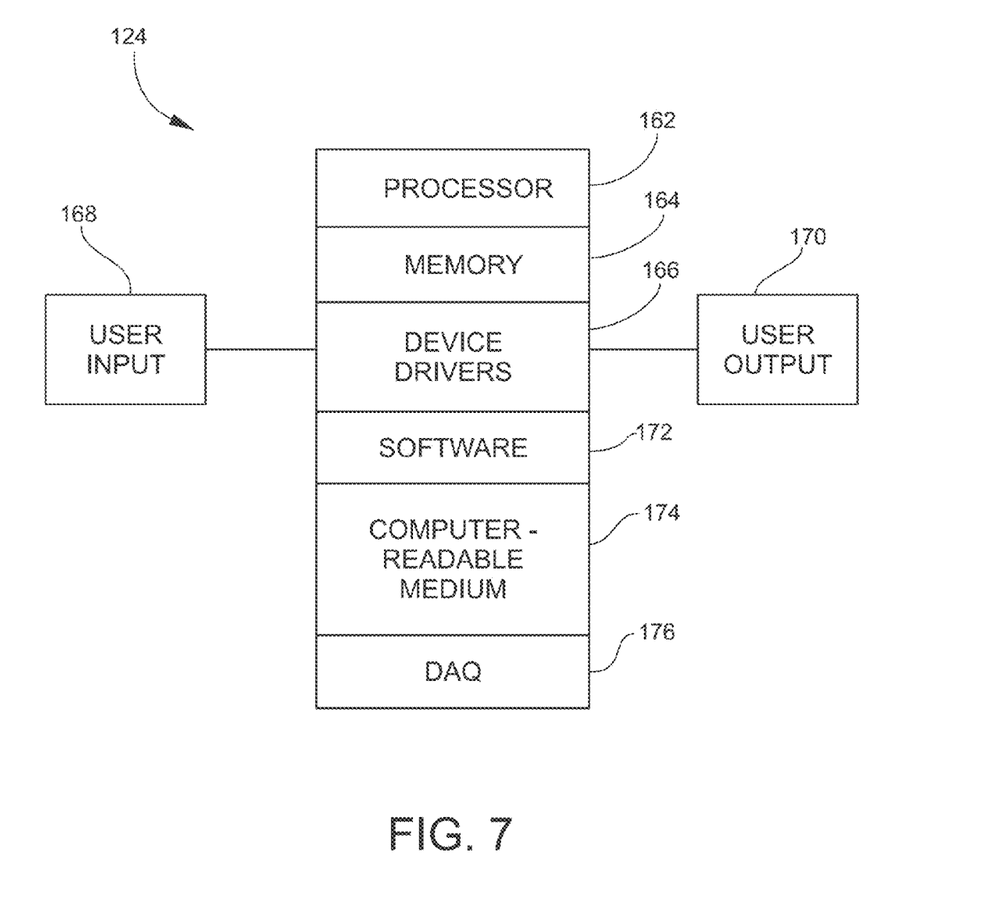
FIG. 7 is a schematic view of an example of a computing device that may be included as part of or in communication with a microscope according to some embodiments.

FIG. 7 is a schematic view of a non-limiting example of the computing device 124 according to some embodiments. In the illustrated embodiment the computing device 124 includes a processor 162 (typically electronics-based), which may be representative of a main electronic processor providing overall control, and one or more electronic processors configured for dedicated control operations or specific signal processing tasks (e.g., a graphics processing unit, or GPU). The computing device 124 also includes one or more memories 164 (volatile and/or non-volatile) for storing data and/or software. The computing device 124 may also include one or more device drivers 166 for controlling one or more types of user interface devices and providing an interface between the user interface devices and components of the computing device 124 communicating with the user interface devices. Such user interface devices may include user input devices 168 (e.g., keyboard, keypad, touch screen, mouse, joystick, trackball, and the like) and user output devices 170 (e.g., display screen, printer, visual indicators or alerts, audible indicators or alerts, and the like). In various embodiments, the computing device 124 may be considered as including one or more user input devices 168 and/or user output devices 170, or at least as communicating with them. The computing device 124 may also include one or more types of computer programs or software 172 contained in memory and/or on one or more types of computer-readable media 174. Computer programs or software may contain instructions (e.g., logic instructions) for performing all or part of any of the methods disclosed herein. Computer programs or software may include application software and system software. System software may include an operating system (e.g., a Microsoft Windows® operating system) for controlling and managing various functions of the computing device 124, including interaction between hardware and application software. In particular, the operating system may provide a graphical user interface (GUI) displayable via a user output device 170 such as a display screen, and with which a user may interact with the use of a user input device 168 such as a keyboard or a pointing device (e.g., mouse). The computing device 124 may also include one or more data acquisition/signal conditioning components 176 (as may be embodied in hardware, firmware and/or software) for receiving and processing the imaging data captured by the light detector 120 (FIG. 1), including formatting data for presentation in graphical form by the GUI, generating 3D images, etc.

It will be understood that FIGS. 1 and 7 are high-level schematic depictions of an example of a microscope 100 and associated computing device 124 consistent with the present disclosure. Other components, such as additional structures, optics components, electronics, and computer- or electronic processor-related components may be included as needed for practical implementations. It will also be understood that the computing device 124 is schematically represented in FIG. 7 as functional blocks intended to represent structures (e.g., circuitries, mechanisms, hardware, firmware, software, etc.) that may be provided. The various functional blocks and signal links have been arbitrarily located for purposes of illustration only and are not limiting in any manner. Persons skilled in the art will appreciate that, in practice, the functions of the computing device 124 may be implemented in a variety of ways and not necessarily in the exact manner illustrated in FIGS. 1 and 7 and described herein.

EXEMPLARY EMBODIMENTS

Exemplary embodiments provided in accordance with the presently disclosed subject matter include, but are not limited to, the following:

1. A method for synthesizing a light field representation of a sample, the method comprising: acquiring bright field image data for a plurality of pixels of the sample; acquiring phase image data for the plurality of pixels; calculating mean ray pointing direction data for the plurality of pixels based on the acquired phase image data; and calculating a light field based on the calculated mean ray pointing direction data and the acquired bright field image data.

2. The method of embodiment 1, wherein measuring mean ray pointing direction data, ($\overline{\theta x}$, $\overline{\theta y}$), is based on the following relation:

$$[\overline{\theta x}, \overline{\theta y}] \propto \frac{\lambda}{2\pi} \nabla \varphi(x, y),$$

wherein φ(x, y) is the phase image data, λ is the wavelength of light utilized to acquire the phase image data, and ∇φ(x, y) is the gradient of the phase image data.

3. The method of embodiment 1 or 2, wherein calculating the light field comprises applying a Gaussian approximation.

4. The method of embodiment 3, comprising calculating the light field, L(x, y, θx, θy), according to the following relation:

$$L(x, y, \theta x, \theta y) = A(x, y) \times e^{\frac{-(\theta_x - \overline{\theta_x})^2}{\sigma^2}} \times e^{\frac{-(\theta_y - \overline{\theta_y})^2}{\sigma^2}},$$

wherein: A(x, y) is the bright field image data; θx and θy are angular components of a light ray emanating from the sample and are obtained from the phase image data; and σ² is the variance of the angle of the light ray.

5. The method of embodiment 1 or 2, comprising calculating the light field by calculating a plurality of light field components based on a plurality of intensity values obtained from the acquired bright field image data, and based on a plurality of mean ray pointing direction values obtained from the acquired phase image data.

6. The method of embodiment 5, comprising calculating the plurality of light field components, $L_{11}$, $L_{12}$, $L_{21}$, $L_{22}$, ..., by solving the following linear set of equations, using bright field and mean phase image data, respectively:

$$L_{11} + L_{12} + L_{13} + \ldots + L_{1N} = I_1$$
$$L_{21} + L_{22} + L_{23} + \ldots + L_{2N} = I_2$$
$$\vdots$$

$$\frac{\theta_1 L_{11} + \theta_2 L_{12} + \theta_3 L_{13} + \ldots + \theta_N L_{1N}}{L_{11} + L_{12} + L_{13} + \ldots + L_{1N}} = \overline{\theta_1}$$

$$\frac{\theta_1 L_{21} + \theta_2 L_{22} + \theta_3 L_{23} + \ldots + \theta_N L_{2N}}{L_{21} + L_{22} + L_{23} + \ldots + L_{2N}} = \overline{\theta_2}$$

$$\vdots,$$

wherein $I_1, I_2, \ldots, I_N$ are the intensity values, $\overline{\theta_1}, \overline{\theta_2}, \ldots, \overline{\theta_N}$ are the mean ray pointing direction values, N is the total number of pixels, and a light field component L is calculated in each direction x and y for each pixel.

7. The method of any of the preceding embodiments, comprising generating one or more perspective views of the sample based on the calculated light field.

8. The method of any of the preceding embodiments, comprising generating one or more three-dimensional images of the sample, one or more depth maps of the sample, or both of the foregoing, based on the calculated light field.

9. The method of any of the preceding embodiments, comprising generating refocused or scan-through-focus images of the sample based on the calculated light field.

10. The method of any of the preceding embodiments, comprising operating a quantitative phase microscope to acquire the bright field image data and the phase image data.

11. A microscope, comprising: a light source; a sample stage; a light detector; a lens assembly between the sample stage and the light detector, wherein the lens assembly and the light detector are configured for acquiring bright field image data for a plurality of pixels of a sample positioned on the sample stage, and for acquiring phase image data for the plurality of pixels; and a computing device configured for performing the method of any of the preceding embodiments.

12. The microscope of embodiment 11, wherein the light source is a lamp, a laser, a laser diode, or a light emitting diode.

13. The microscope of embodiment 11 or 12, wherein the light detector is a charge-coupled device or an active-pixel sensor.

14. The microscope of any of embodiments 11 to 13, wherein the lens assembly comprises a micro-lens array.

15. The microscope of any of embodiments 11 to 14, wherein the microscope is configured as a quantitative phase microscope configured for performing a quantitative phase measurement/imaging technique.

16. The microscope of any of embodiments 11 to 15, wherein the computing device is configured for generating one or more images of the sample based on the calculated light field.

17. The microscope of embodiment 16, wherein the one or more images are selected from the group consisting of: a perspective view, a three-dimensional image, a depth map, a refocused image, and a scan-through-focus image.

18. A microscope configured for performing the method of any of the preceding embodiments.

19. A system for acquiring perspective images of a sample, the system comprising: a processor and a memory configured for performing all or part of the method of any of the preceding embodiments.

20. A computer-readable storage medium comprising instructions for performing all or part of the method of any of the preceding embodiments.

21. A system comprising the computer-readable storage medium of embodiment 20.

Methods for synthesizing a light field representation of a sample such as described above and illustrated in the Figures may be performed (carried out), for example, in a system that includes a processor and a memory as may be embodied in, for example, a computing device which may communicate with a user input device and/or a user output device. In some embodiments, the system for synthesizing a light field representation of a sample (or an associated computing device) may be considered as including the user input device and/or the user output device. As used herein, the term "perform" or "carry out" may encompass actions such as controlling and/or signal or data transmission. For example, a computing device such as illustrated in FIGS. 1 and 5, or a processor thereof, may perform a method step by controlling another component involved in performing the method step. Performing or controlling may involve making calculations, or sending and/or receiving signals (e.g., control signals, instructions, measurement signals, parameter values, data, etc.).

As used herein, an "interface" or "user interface" is generally a system by which users interact with a computing device. An interface may include an input (e.g., a user input device) for allowing users to manipulate a computing device, and may include an output (e.g., a user output device) for allowing the system to present information and/or data, indicate the effects of the user's manipulation, etc. An example of an interface on a computing device includes a graphical user interface (GUI) that allows users to interact with programs in more ways than typing. A GUI typically may offer display objects, and visual indicators, as opposed to (or in addition to) text-based interfaces, typed command labels or text navigation to represent information and actions available to a user. For example, an interface may be a display window or display object, which is selectable by a user of a computing device for interaction. The display object may be displayed on a display screen of a computing device and may be selected by and interacted with by a user using the interface. In one non-limiting example, the display of the computing device may be a touch screen, which may display the display icon. The user may depress the area of the touch screen at which the display icon is displayed for selecting the display icon. In another example, the user may use any other suitable interface of a computing device, such as a keypad, to select the display icon or display object. For example, the user may use a track ball or arrow keys for moving a cursor to highlight and select the display object.

It will be understood that one or more of the processes, sub-processes, and process steps described herein may be performed by hardware, firmware, software, or a combination of two or more of the foregoing, on one or more electronic or digitally-controlled devices. The software may reside in a software memory (not shown) in a suitable electronic processing component or system such as, for example, the computing device 124 schematically depicted in FIGS. 1 and 7. The software memory may include an ordered listing of executable instructions for implementing logical functions (that is, "logic" that may be implemented in digital form such as digital circuitry or source code, or in analog form such as an analog source such as an analog electrical, sound, or video signal). The instructions may be executed within a processing module, which includes, for example, one or more microprocessors, general purpose processors, combinations of processors, digital signal processors (DSPs), or application specific integrated circuits (ASICs). Further, the schematic diagrams describe a logical division of functions having physical (hardware and/or software) implementations that are not limited by architecture or the physical layout of the functions. The examples of systems described herein may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., the computing device 124 in FIGS. 1 and 7), direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this disclosure, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

It will also be understood that the term "in signal communication" as used herein means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

More generally, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for synthesizing a light field representation of a sample, the method comprising:
   acquiring bright field image data for a plurality of pixels of the sample;
   acquiring phase image data for the plurality of pixels;
   calculating mean ray pointing direction data, $(\overline{\theta x}, \overline{\theta y})$, for the plurality of pixels based on the acquired phase image data, based on the following relation: $[\overline{\theta x}, \overline{\theta y}] \propto \lambda/2\pi \nabla \phi(x, y)$, wherein $\phi(x, y)$ is the phase image data, $\lambda$ is the wavelength of light utilized to acquire the phase image data, and $\nabla \phi(x, y)$ is the gradient of the phase image data; and
   calculating a light field based on the calculated mean ray pointing direction data and the acquired bright field image data.

2. The method of claim 1, wherein calculating the light field comprises applying a Gaussian approximation.

3. The method of claim 2, comprising calculating the light field, $L(x, y, \theta x, \theta y)$, according to the following relation:

$$L(x, y, \theta x, \theta y) = A(x, y) \times e^{\frac{-(\theta_x - \overline{\theta_x})^2}{\sigma^2}} \times e^{\frac{-(\theta_y - \overline{\theta_y})^2}{\sigma^2}},$$

wherein:
   $A(x, y)$ is the bright field image data;
   $\theta x$ and $\theta y$ are angular components of a light ray emanating from the sample and are obtained from the phase image data; and
   $\sigma^2$ is the variance of the angle of the light ray.

4. The method of claim 1, comprising calculating the light field by calculating a plurality of light field components based on a plurality of intensity values obtained from the acquired bright field image data, and based on a plurality of mean ray pointing direction values obtained from the acquired phase image data.

5. The method of claim 4, comprising calculating the plurality of light field components, $L_{11}, L_{12}, L_{21}, L_{22}, \ldots$, by solving the following linear set of equations, using bright field and mean phase image data, respectively:

$$L_{11} + L_{12} + L_{13} + \ldots + L_{1N} = I_1$$
$$L_{21} + L_{22} + L_{23} + \ldots + L_{2N} = I_2$$
$$\vdots$$
$$\frac{\theta_1 L_{11} + \theta_2 L_{12} + \theta_3 L_{13} + \ldots + \theta_N L_{1N}}{L_{11} + L_{12} + L_{13} + \ldots + L_{1N}} = \overline{\theta_1}$$
$$\frac{\theta_1 L_{21} + \theta_2 L_{22} + \theta_3 L_{23} + \ldots + \theta_N L_{2N}}{L_{21} + L_{22} + L_{23} + \ldots + L_{2N}} = \overline{\theta_2}$$
$$\vdots,$$

wherein $I_1, I_2, \ldots, I_N$ are the intensity values, $\overline{\theta_1}, \overline{\theta_2}, \ldots, \overline{\theta_N}$ are the mean ray pointing direction values, N is the total number of pixels, and a light field component L is calculated in each direction x and y for each pixel.

6. The method of claim 1, comprising generating one or more perspective views of the sample based on the calculated light field.

7. The method of claim 1, comprising generating one or more three-dimensional images of the sample, one or more depth maps of the sample, or both of the foregoing, based on the calculated light field.

8. The method of claim 1, comprising generating refocused or scan-through-focus images of the sample based on the calculated light field.

9. The method of claim 1, comprising operating a quantitative phase microscope to acquire the bright field image data and the phase image data.

10. A microscope, comprising:
a light source;
a sample stage;
a light detector;
a lens assembly between the sample stage and the light detector, wherein the lens assembly and the light detector are configured for acquiring bright field image data for a plurality of pixels of a sample positioned on the sample stage, and for acquiring phase image data for the plurality of pixels; and
a computing device configured for performing the method of claim 1.

11. The microscope of claim 10, wherein the light source is a lamp, a laser, a laser diode, or a light emitting diode.

12. The microscope of claim 10, wherein the light detector is a charge-coupled device or an active-pixel sensor.

13. The microscope of claim 10, wherein the lens assembly comprises a micro-lens array.

14. The microscope of claim 10, wherein the microscope is configured as a quantitative phase microscope configured for performing a quantitative phase measurement/imaging technique.

15. The microscope of claim 10, wherein the computing device is configured for generating one or more images of the sample based on the calculated light field.

16. The microscope of claim 15, wherein the one or more images are selected from the group consisting of: a perspective view, a three-dimensional image, a depth map, a refocused image, and a scan-through-focus image.

17. A system for acquiring perspective images of a sample, the system comprising:
a processor and a memory configured for performing the method of claim 1.

18. A non-transitory computer-readable storage medium comprising instructions stored thereon, than when executed by a computing device, controls the step of calculating a light field according to the method of claim 1.

19. A system comprising the computer-readable storage medium of claim 18.

20. A method for synthesizing a light field representation of a sample, the method comprising:
acquiring bright field image data for a plurality of pixels of the sample;
acquiring phase image data for the plurality of pixels;
calculating mean ray pointing direction data for the plurality of pixels based on the acquired phase image data; and
calculating a light field, L(x, y, θx, θy), based on the calculated mean ray pointing direction data and the acquired bright field image data, wherein calculating the light field comprises applying a Gaussian approximation according to the following relation:

$$L(x, y, \theta x, \theta y) = A(x, y) \times e^{\frac{-(\theta_x - \overline{\theta_x})^2}{\sigma^2}} \times e^{\frac{-(\theta_y - \overline{\theta_y})^2}{\sigma^2}},$$

wherein:
A(x, y) is the bright field image data;
θx and θy are angular components of a light ray emanating from the sample and are obtained from the phase image data; and
$\sigma^2$ is the variance of the angle of the light ray.

21. A method for synthesizing a light field representation of a sample, the method comprising:
acquiring bright field image data for a plurality of pixels of the sample;
acquiring phase image data for the plurality of pixels;
calculating mean ray pointing direction data for the plurality of pixels based on the acquired phase image data; and
calculating a light field based on the calculated mean ray pointing direction data and the acquired bright field image data, by calculating a plurality of light field components, $L_{11}, L_{12}, L_{21}, L_{22}, \ldots$, based on a plurality of intensity values obtained from the acquired bright field image data, and based on a plurality of mean ray pointing direction values obtained from the acquired phase image data, wherein calculating the plurality of light field components comprises solving the following linear set of equations, using bright field and mean phase image data, respectively:

$$L_{11} + L_{12} + L_{13} + \ldots + L_{1N} = I_1$$
$$L_{21} + L_{22} + L_{23} + \ldots + L_{2N} = I_2$$
$$\vdots$$
$$\frac{\theta_1 L_{11} + \theta_2 L_{12} + \theta_3 L_{13} + \ldots + \theta_N L_{1N}}{L_{11} + L_{12} + L_{13} + \ldots + L_{1N}} = \overline{\theta_1}$$
$$\frac{\theta_1 L_{21} + \theta_2 L_{22} + \theta_3 L_{23} + \ldots + \theta_N L_{2N}}{L_{21} + L_{22} + L_{23} + \ldots + L_{2N}} = \overline{\theta_2}$$
$$\vdots,$$

wherein $I_1, I_2, \ldots, I_N$ are the intensity values, $\overline{\theta_1}, \overline{\theta_2}, \ldots, \overline{\theta_N}$ are the mean ray pointing direction values, N is the total number of pixels, and a light field component L is calculated in each direction x and y for each pixel.

* * * * *

UNITED STATES PATENT AND TRADEMARK OFFICE
CERTIFICATE OF CORRECTION

PATENT NO. : 9,726,875 B2  
APPLICATION NO. : 14/502586  
DATED : August 8, 2017  
INVENTOR(S) : Varun Raghunathan Page 1 of 1

It is certified that error appears in the above-identified patent and that said Letters Patent is hereby corrected as shown below:

In Column 12, Line 67, in Claim 5, delete "$\overline{\theta_1}, \overline{\theta_2}, \ldots, \overline{\theta_N}$" and insert -- $\overline{\theta}_1, \overline{\theta}_2, \ldots, \overline{\theta}_N$ --, therefor.

Signed and Sealed this  
Twentieth Day of February, 2018

Andrei Iancu  
*Director of the United States Patent and Trademark Office*